Patented Feb. 15, 1938

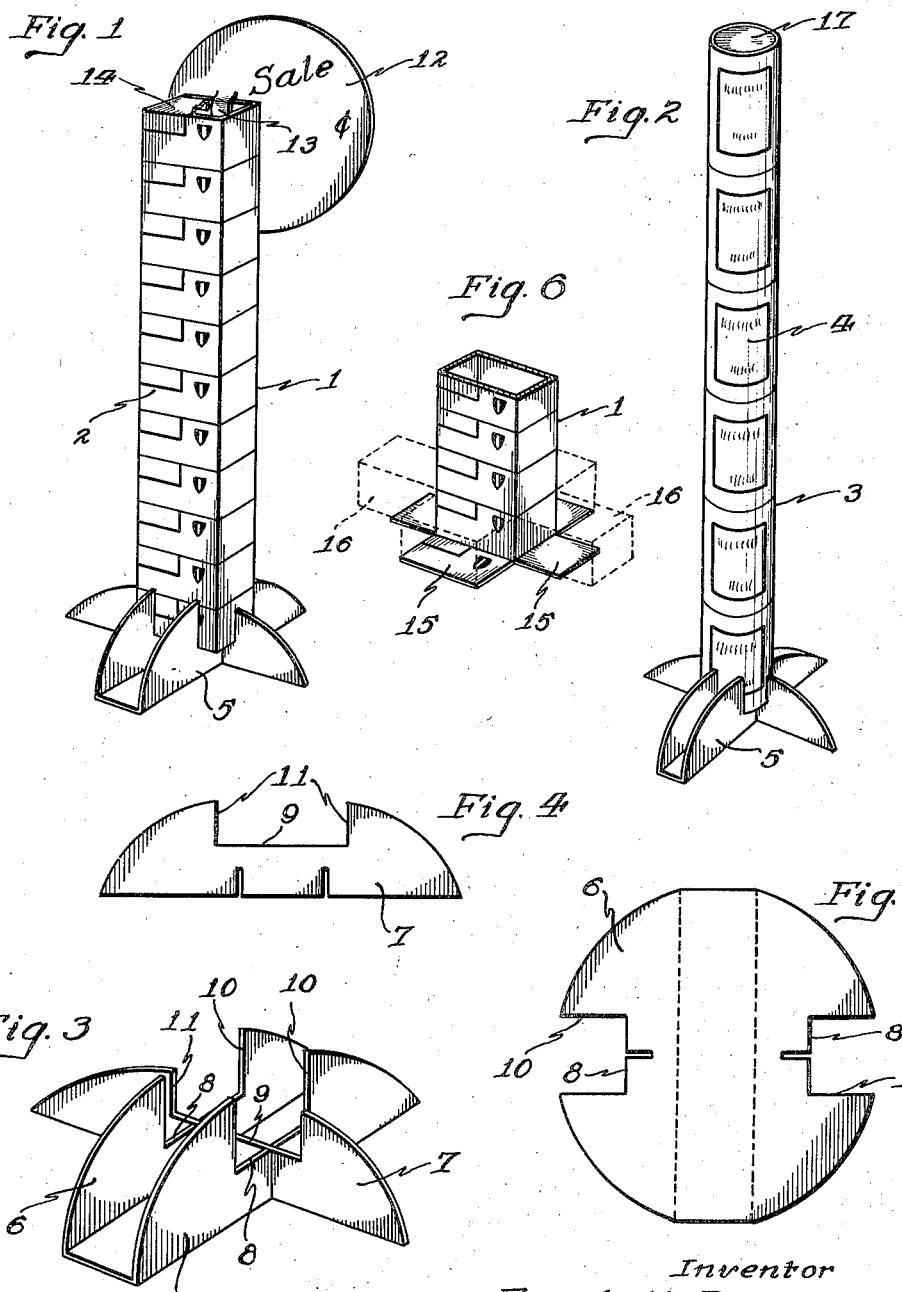

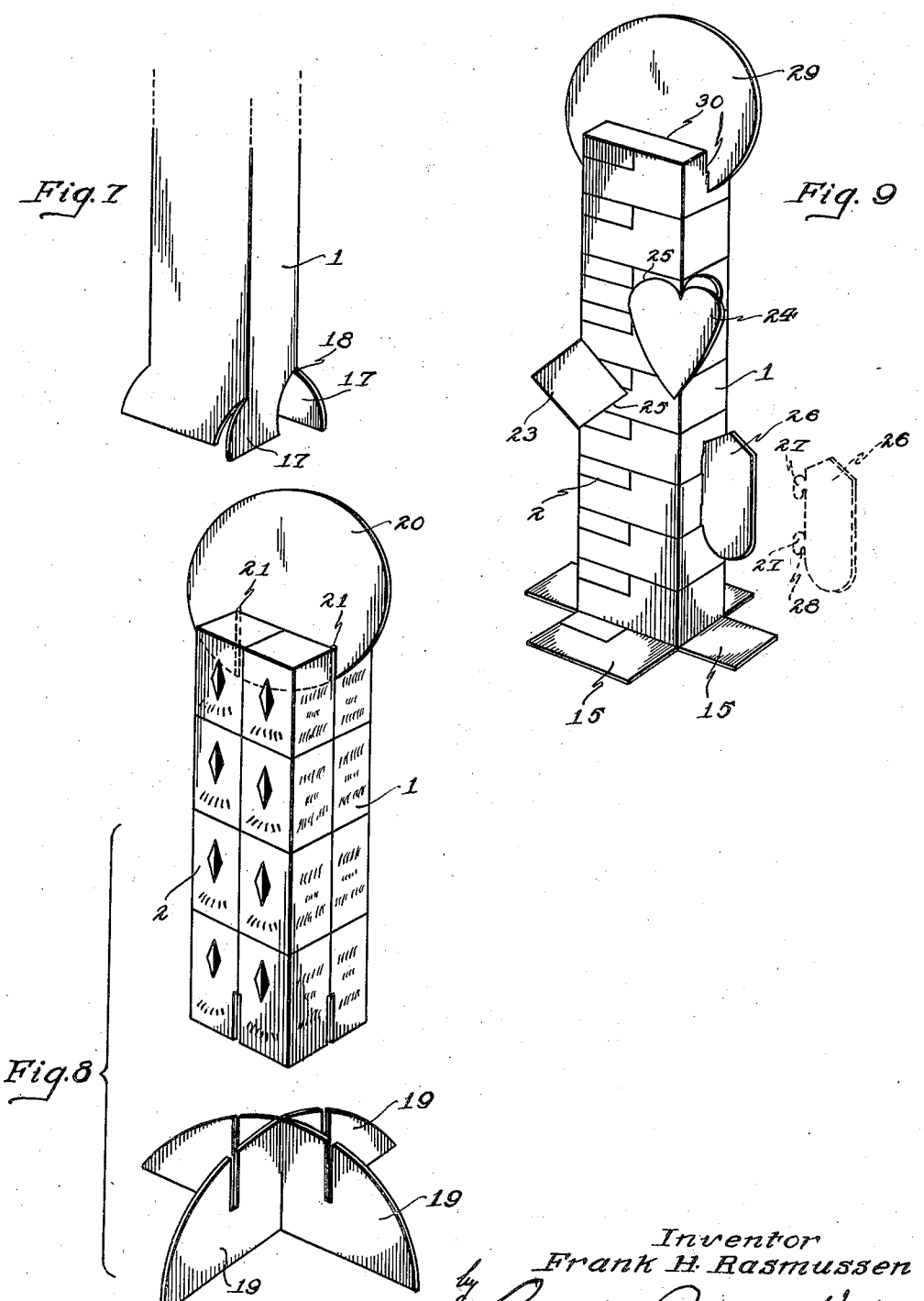

2,108,349

UNITED STATES PATENT OFFICE 2,108,349

ADVERTISING DEVICE AND MAILING TUBE

Frank H. Rasmussen, Chicago, Ill., assignor to Magill-Weinsheimer Company, Chicago, Ill., a corporation of Illinois Application June 12, 1936, Serial No. 84,879
Renewed January 5, 1938

4 Claims. (Cl. 40—126)

This invention relates to tubular cardboard constructions formed to simulate a column, or massed columns, of labeled cartons or cans and is of the class of advertising devices such as disclosed in Patent No. 643,124 of February 13, 1900 on a sign, to E. P. Gresh, and Patent No. 1,907,716 of May 9, 1913, on a display device to L. L. Berkowitz.

The object of the present invention is to improve upon such constructions by simplification thereof and incidentally by making them available for use as mailing tubes.

A further purpose of the invention is to provide a simple base support for the simulated stack of cartons; and to provide a simple die-cut construction simulating a stack of labeled cartons and arranged to provide or support projecting members for carrying printed advertising matter.

In the accompanying drawings which illustrate the improved construction,

Figure 1 is a perspective view of a tube or column in rectangular form and its support.

Fig. 2 is a perspective view of a cylindrical form of tube and its support.

Fig. 3 is a perspective of a cardboard support for a tube or column.

Fig. 4 is a plan of one element of the support.

Fig. 5 is a plan of another element of the support.

Fig. 6 is a perspective view, partly in section, showing the lower end of a tube, or column, with its end flaps bent outwardly to form supporting feet.

Fig. 7 is a perspective view showing the lower end of a column having a modified form of integral supporting feet.

Figure 8 is a perspective view showing a column with a detachable projecting advertising member at its top and a modified form of support, the support being detached to show its construction and manner of attachment to the column.

Fig. 9 is a perspective view of a column showing integrally formed projecting advertising members and modified forms of detachable advertising members, one of said members being shown in dotted outline, detached, to illustrate a manner of attaching the same to the column.

The invention is carried out by the use of cardboard tubes of various cross-sections, such as square, hexagonal, round or as otherwise required, for simulating a column or stack of cartons or cans or packages of various makes. The cardboard tube may be like a standard mailing tube except that it carries from end to end a series of labels, the same as the original cartons or packages which the tube is intended to simulate in stacked columnar arrangement.

Each of the two forms of tubes illustrated is preferably made of cardboard, one of rectangular cross-section indicated by numeral 1 in Figures 1 and 6 to 9 inclusive and carrying a printed sheet or a series of labels 2, so as to render these tubes in appearance precisely like a neatly formed stack of rectangular cardboard packages, such as are used in the case of butter, cheese and other products.

The cylindrical form 3 illustrated by Figure 2 is the same as a standard mailing tube with a diameter equal to the diameter of the jars or tinned cans which are standard for preserved food stuffs or any other packaged products. The tube carries a printed sheet showing a series of labels 4, one above the other, and encircling the tube so as to give it the appearance of a column formed by cylindrical cans or jars.

A cardboard support 5, suitable for either the rectangular or cylindrical form of the advertising device, is formed of the two cardboard pieces 6 and 7 cut and bent as indicated in Figure 3. This manner of forming the supports provides base edges 8 and 9 for the advertising tube or column to rest upon and six shoulders 10 and 11 for engaging sides of the same.

A price tag, or advertising member, 12 having a tongue 13 formed by slitting the tag is applied to the top of the column by inserting the tongue between the end flap 14 and the side wall of the column.

Figure 6 illustrates an optional method of providing a support for the tube 1 by bending feet 15 outwardly from the lower end of the tube. The feet 15 are held in position against the supporting surface by the weights 16, shown by broken lines, which may be actual packages of the goods represented by the stack or column, or suitably weighted cartons.

In using the construction, it is generally placed in a conspicuous position so that the labels thereon and the projecting price tag or advertising member may be read by a shopper and these members contain detailed information as to contents and other matters concerning the simulated packages. The actual packaged goods, therefore, need not be on display in windows, on counters or shelves, merely for advertising purposes. Use of the device in this manner results in the saving of space in a sales room, eliminates handling of the goods by customers and permits of the keeping of all or a major portion of the stock in storage spaces therefor not necessarily visible to the customer.

In Fig. 7 a modified arrangement of supporting feet for the stack or column is illustrated. In this arrangement the feet 17 are formed by die-cutting the side walls of a column to provide portions which will project laterally from the bottom end of the device when it is folded into tubular form. This is done when the original flat blank is cut and scored for folding, the scorings along the lines of fold between the several panels being terminated short of the end that is to be the bottom of the device, as at 18, and a diagonal cut being made across the corner of each panel from the end of the scoring to the end edge of the panel. Thus each panel has an integral foot cut from the next adjacent panel and when the blank is folded along the scored lines of fold each foot will remain in the plane of the respective panel to which it is attached and project laterally from the folded structure to provide a stable support for the same.

Figure 8 illustrates another form of supporting base for the stack or column and also a modified method of attaching the price tag or advertising card. As shown this form of base consists of two substantially semicircular pieces 19 cut so as to interfit with each other in crossed interlocking relationship. Each piece or base member is provided with a pair of slots spaced apart to receive the side panels of the column and each column side panel is slotted upwardly from the bottom end so that when the column is placed over the base it will interfit with the same and be rigidly supported.

The price tag or advertising card 20 is provided with a pair of slots 21 spaced apart the width of the stack or column and the top end of the column is slotted to receive the tongue 22 formed between the slots 21. Thus the card or member 20 when attached to the stack or column will be securely held and may project from the column in either a balanced or unbalanced position, depending upon the direction of the slots 21 relative to the edge of the card.

In Figure 9 several optional arrangements for providing projecting advertising members are shown. One of these is indicated by the numerals 23 and 24, wherein the advertising members are integral with the stack or column and have the appearance of cards mounted on the face of the column. With this arrangement, the projecting portions of the members are cut from the side panels adjacent the face panel and when the device is folded into its columnar form the projecting portions remain in the plane of the face panel. These members may have any desired shape as indicated and the design is completed by printing on the face panel of the column, as indicated by the dotted lines 25.

Another arrangement shown in Fig. 9 is that in which a removable advertising member 26 is mounted on the side of the stack or column 1 by means of ears 27 which fit into suitable slots cut in the side panel, the ears 27 being undercut as at 28 to provide hooks for locking the member 26 in place.

An optional method of mounting the top member 29 is also shown in Fig. 9 and consists in providing a slot 30 across the top of the column and part way down each side as well as slots in the member 29 so that the member 29 will set into the column and be supported by the edges of the vertical portions of the slot 30.

Although several embodiments of this invention are herein shown and described, it will be understood that details of the constructions shown may be altered or omitted without departing from the spirit of this invention as defined by the following claims:

I claim:

1. A device of the class described suitable for use in advertising or as a mailing tube consisting of the tubular construction having mounted thereon a series of package labels whereby the tubular construction has the appearance of a stack of packages, in combination with a cardboard support consisting of a pair of interfitting cardboard members arranged to provide a seat for the tube, including a plurality of shoulders for engaging the tube at its sides.

2. A device of the class described comprising a flat folding cardboard columnar construction having a plurality of connected side panels one of which includes an integral laterally projecting portion cut from the next adjacent panel at a point intermediate its ends and projecting outwardly from the body of said construction when the same is folded into columnar form, said construction having a plurality of package labels mounted thereon to simulate a stack of packages, and said projecting portion carrying printed information relative to the product represented by said packages.

3. A device of the class described suitable for use in advertising or as a mailing tube consisting of a tubular cardboard construction having its outer surface prepared so that the tubular construction has the appearance of a stack of packages, and integral rigid supporting feet cut from the side wall of the tube and projecting outwardly from the bottom thereof in vertical planes.

4. A device of the class described comprising a flat-folding cardboard columnar construction having a plurality of connected side panels each of which includes an integral laterally projecting portion cut from the next adjacent panel at the bottom end thereof and arranged to project outwardly from the body of said construction when the same is folded into columnar form, said construction having its outer surface prepared to simulate a stack of packages, and said projecting portions serving as feet to support said construction vertically.

FRANK H. RASMUSSEN.